(12) United States Patent
Song

(10) Patent No.: US 11,422,415 B2
(45) Date of Patent: Aug. 23, 2022

(54) BASE PLATE AND DISPLAY PANEL

(71) Applicant: HKC Corporation Limited, Guangdong (CN)

(72) Inventor: Zhenli Song, Guangdong (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 17/043,157

(22) PCT Filed: Nov. 28, 2018

(86) PCT No.: PCT/CN2018/118016
§ 371 (c)(1),
(2) Date: Sep. 29, 2020

(87) PCT Pub. No.: WO2020/087615
PCT Pub. Date: May 7, 2020

(65) Prior Publication Data
US 2021/0149238 A1 May 20, 2021

(30) Foreign Application Priority Data
Oct. 29, 2018 (CN) .......................... 201821759909.5

(51) Int. Cl.
G02F 1/136 (2006.01)
G02F 1/1362 (2006.01)
G02F 1/1368 (2006.01)

(52) U.S. Cl.
CPC ........ *G02F 1/13606* (2021.01); *G02F 1/1368* (2013.01); *G02F 1/136222* (2021.01); *G02F 1/136227* (2013.01); *G02F 2202/103* (2013.01)

(58) Field of Classification Search
None
See application file for complete search history.

(56) References Cited

U.S. PATENT DOCUMENTS 9,437,487 B2  9/2016  Shu et al.
9,673,231 B2  6/2017  Shu et al.
(Continued)

FOREIGN PATENT DOCUMENTS

CN  103064224 A  4/2013
CN  104360557 A  2/2015
(Continued)

OTHER PUBLICATIONS

International Search Report for Application No. PCT/CN2018/118016 dated Jul. 16, 2019, 2 pages.

*Primary Examiner* — Richard H Kim

(57) ABSTRACT

A base plate, comprising: a substrate; an array switch formed on the substrate; a first passivation layer formed at the array switch; a second passivation layer located on the first passivation layer; at least one color filter layer formed between the first passivation layer and the second passivation layer; a distance adjustment layer formed between the first passivation layer and the second passivation layer so as to increase a distance between the first passivation layer and the second passivation layer; and a pixel electrode layer formed on the second passivation layer, the pixel electrode layer being electrically connected to the array switch by means of a via penetrating the first passivation layer, the color filter layer, the distance adjustment layer, and the second passivation layer.

17 Claims, 1 Drawing Sheet

(56) References Cited

U.S. PATENT DOCUMENTS

| | | | |
|---|---|---|---|
| 9,818,762 B2 | 11/2017 | Im | |
| 2016/0148838 A1* | 5/2016 | Shu | G02F 1/13394 |
| | | | 257/72 |
| 2016/0254285 A1* | 9/2016 | Long | H01L 29/78678 |
| | | | 257/72 |

FOREIGN PATENT DOCUMENTS

| | | |
|---|---|---|
| CN | 204188927 U | 3/2015 |
| CN | 107045237 A | 8/2017 |
| KR | 20060000288 A | 1/2006 |
| KR | 20080062242 A | 7/2008 |

* cited by examiner

BASE PLATE AND DISPLAY PANEL

CROSS REFERENCE TO RELATED APPLICATIONS

This application is a U.S. National Stage application of, and claims priority to, PCT/CN2018/118016, filed Nov. 28, 2018, which further claims priority to Chinese Patent Application No. 201821759909.5, filed Oct. 29, 2018, the entire contents of which are incorporated herein in their entirety.

TECHNICAL FIELD

The present disclosure relates to the field of display panel technologies, and more particularly relates to a substrate and a display panel.

BACKGROUND

The description herein provides only background information related to the present disclosure, but does not necessarily constitute the existing technology.

Usually, a liquid crystal display consists of a backlight module, a thin film transistor (TFT) substrate, a color filter (CF) substrate, and a liquid crystal (LC) layer between the two substrates. A principle of substrates thereof is to apply a voltage to the two substrates to make liquid crystal molecules deflect, to refract light of the backlight module to generate an image. A color-filter on array (COA) technology is an integration technology that a color filter is directly prepared on a TFT substrate. In a conventional color-filter on array, coupling capacitance between a pixel electrode and a data line is relatively large. Consequently, display quality of a display panel is affected.

SUMMARY

According to the embodiments of the present disclosure, a substrate and a display panel are provided.

A substrate, comprising:
an underlayer;
an array switch, formed on the underlayer;
a first passivation layer, formed on the array switch;
a second passivation layer, located on the first passivation layer;
at least one color filter layer, formed between the first passivation layer and the second passivation layer;
a distance adjustment layer, formed between the first passivation layer and the second passivation layer, to increase a distance between the first passivation layer and the second passivation layer; and
a pixel electrode layer, formed on the second passivation layer, wherein the pixel electrode layer is electrically connected to the array switch via a through hole penetrating the first passivation layer, the color filter layer, the distance adjustment layer, and the second passivation layer.

In the foregoing substrate, not only the color filter layer but also the distance adjustment layer is formed between the first passivation layer and the second passivation layer. The distance adjustment layer is used to increase the distance between the first passivation layer and the second passivation layer, so that a distance between a pixel electrode formed on the second passivation layer and a data line of the array switch increases, thereby reducing coupling capacitance between the pixel electrode and the data line, and improving display quality of the display panel.

In an embodiment, a projection of the first passivation layer on the underlayer is located in a projection of the distance adjustment layer on the underlayer, and the projection of the distance adjustment layer on the underlayer is located in a projection of the second passivation layer on the underlayer.

In an embodiment, the distance adjustment layer comprises at least one of a passivation layer and a color filter layer.

In an embodiment, the distance adjustment layer is a film layer prepared by using a mask the same as the first passivation layer.

In an embodiment, the distance adjustment layer is a film layer prepared by using a mask the same as the second passivation layer.

In an embodiment, the distance adjustment layer is a film layer prepared by using a mask the same as the color filter layer.

In an embodiment, the number of the distance adjustment layers is less than or equal to 10.

In an embodiment, the distance adjustment layer is a passivation layer, and the number of the distance adjustment layers is 1 to 5.

In an embodiment, a thickness of each distance adjustment layer is 100 microns to 200 microns.

In an embodiment, each distance adjustment layer is disposed between two adjacent color filter layers.

In an embodiment, the distance adjustment layer is a transparent film layer.

In an embodiment, a surface of each distance adjustment layer is a flat surface.

In an embodiment, the array switch comprises:
a gate, formed on the underlayer;
a gate insulation layer, formed on the underlayer and covering the gate;
a semi-conductor layer, formed on the gate insulation layer; and
a source and a drain, formed on the gate insulation layer, and respectively connected to two ends of the semi-conductor layer, wherein
the array switch further comprises a data line, a scanning line, and a power line; the data line is formed on a same horizontal plane as the source and the drain; the scanning line and the power line are both located on a same horizontal plane as the source and the drain; and the scanning line is connected to the gate of the array switch.

In an embodiment, the pixel electrode layer is connected to the drain in the array switch.

In an embodiment, the semi-conductor layer comprises an amorphous silicon layer and an N+ doped amorphous silicon layer, and the amorphous silicon layer and the N+ doped amorphous silicon layer are sequentially disposed on the gate insulation layer in a stacking manner.

In an embodiment, the through hole is a through hole having a stepped structure.

A substrate, comprising:
an underlayer;
an array switch, formed on the underlayer;
a first passivation layer, formed on the array switch;
a second passivation layer, located on the first passivation layer;
two color filter layers, both formed between the first passivation layer and the second passivation layer;
a distance adjustment layer, formed between the two color filter layers, to increase a distance between the first passivation layer and the second passivation layer, wherein the distance adjustment layer is a passivation layer; and a pixel electrode layer, formed on the second passivation layer, wherein the pixel electrode layer is electrically connected to the array switch via a through hole penetrating the first passivation layer, the color filter layer, the distance adjustment layer, and the second passivation layer.

A display panel, comprising a substrate, wherein the substrate comprises:

an underlayer;

an array switch, formed on the underlayer;

a first passivation layer, formed on the array switch;

a second passivation layer, located on the first passivation layer;

at least one color filter layer, formed between the first passivation layer and the second passivation layer;

a distance adjustment layer, formed between the first passivation layer and the second passivation layer, to increase a distance between the first passivation layer and the second passivation layer; and a pixel electrode layer, formed on the second passivation layer, wherein the pixel electrode layer is electrically connected to the array switch via a through hole penetrating the first passivation layer, the color filter layer, the distance adjustment layer, and the second passivation layer.

In an embodiment, a projection of the first passivation layer on the underlayer is located in a projection of the distance adjustment layer on the underlayer, and the projection of the distance adjustment layer on the underlayer is located in a projection of the second passivation layer on the underlayer.

In an embodiment, the display panel is a liquid crystal display panel.

Details of one or more embodiments of the present disclosure are provided in the following accompanying drawings and descriptions. Other features, objectives, and advantages of the present disclosure become more obvious with reference to the specification, the accompanying drawings, and the claims.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present application, and persons of ordinary skill in the art may still derive other drawings from these accompanying drawings without creative efforts.

DETAILED DESCRIPTION OF THE EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

In the description of the present disclosure, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, it should be noted that when an element is referred to as being "formed on" another element, t it can be directly coupled or connected to the other element or intervening elements may also be present. When an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

Figure 1:
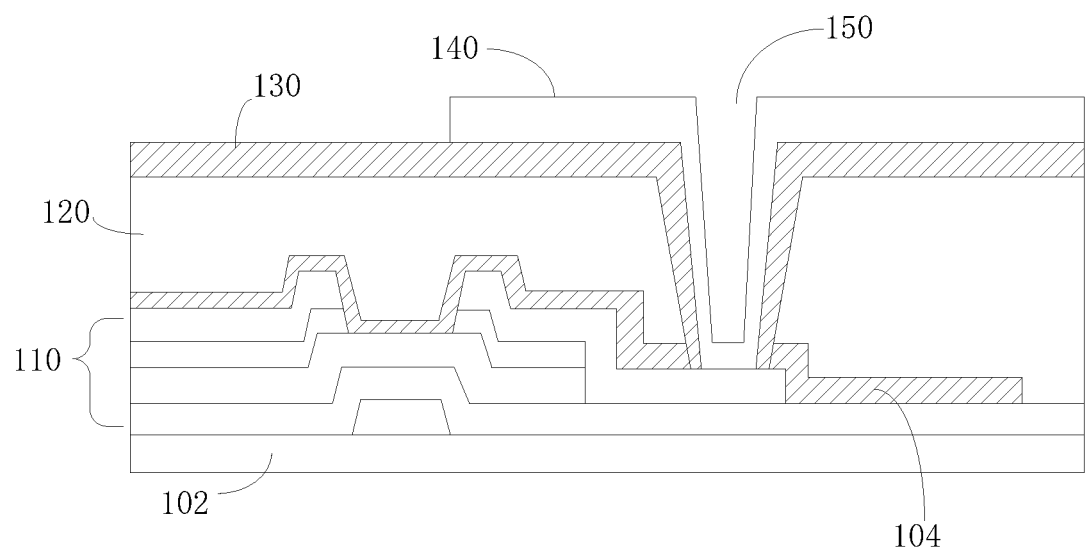
FIG. 1 is a schematic diagram of a conventional substrate.

A color-filter on array (COA) substrate is a substrate structure obtained by directly integrating a color filter layer on a thin film transistor (TFT). FIG. 1 is a schematic structural diagram of a conventional color-filter on array substrate (collectively referred to as the COA substrate hereinafter). Referring to FIG. 1, the COA substrate includes a substrate 102, an array switch 110, a first passivation layer 104, a color filter layer 120, a second passivation layer 130, and a pixel electrode 140 formed on the second passivation layer 130. The array switch 110 is formed on one side of the substrate 102. The first passivation layer 104 is formed on one side, away from the substrate 102, of the array switch 110. The color filter layer 120 is formed on one side, away from the array switch 110, of the first passivation layer 110. The second passivation layer 130 is formed on one side, away from the first passivation layer 110, of the color filter layer 120. The pixel electrode 140 is formed on the second passivation layer 130, and is electrically connected to the array switch 110 via a through hole 150. The array switch 110 may use a common array switch structure in this field, and those skilled in the art all know that the pixel electrode 140 is connected to a drain in the array switch 110 via the through hole 150.

As can be seen from FIG. 1 that, compared with a conventional structure that an array switch and a color film substrate are disposed opposite to each other, in a COA substrate, the color filter layer 120 is formed on the first passivation layer 104, and then the second passivation layer 130 is formed on the color filter layer 120, and next, the pixel electrode 140 is formed on the second passivation layer 130. Consequently, parasitic capacitance Cpd is formed between non-connected conductive electrodes on the pixel electrode 140 and the array switch 110, and the display quality of the display panel is affected.

Figure 2:
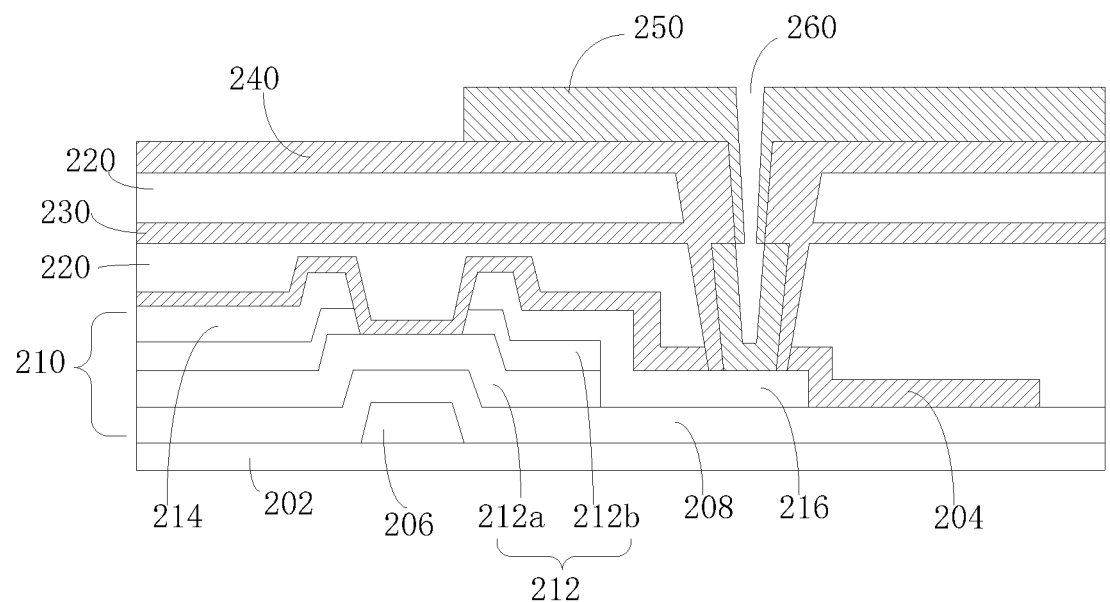
FIG. 2 is a schematic diagram of a substrate according to an embodiment.

To resolve a problem of display quality caused by a conventional COA substrate, a substrate is provided. A substrate according to an embodiment is shown in FIG. 2. The substrate includes an underlayer 202, an array switch 210, a first passivation layer 204, a color filter layer 220, a distance adjustment layer 230, a second passivation layer 240, and a pixel electrode layer 250. The array switch is disposed on the underlayer 202. In the present disclosure, a side of the underlayer 202, on which the array switch 210 is disposed, is up, and the opposite side is down. The first passivation layer 204 is formed on the array switch 210. The first passivation layer 204 is used as a protective layer to protect the array switch, it can convert a metal surface in the array switch into a state of not being easily oxidized, thereby delaying a corrosion speed of metal.

The second passivation layer 240 is formed on the first passivation layer 204. The color filter layer 220 is formed between the first passivation layer 204 and the second passivation layer 240. There is at least one color filter layer 220. The distance adjustment layer 230 is also disposed between the first passivation layer 204 and the second passivation layer 240. The pixel electrode layer 250 is formed on the second passivation layer 240. The pixel electrode layer 250 is electrically connected to the array switch 210 via a through hole 260 penetrating the first passivation layer 204, the color filter layer 220, the distance adjustment layer 230, and the second passivation layer 240. Those skilled in the art all know that the pixel electrode layer 250 is connected to a drain in the array switch 210.

In the foregoing substrate, not only the color filter layer 220 but also the distance adjustment layer 230 is formed between the first passivation layer 204 and the second passivation layer 240. The distance adjustment layer 230 can increase the distance between the first passivation layer 204 and the second passivation layer 240, so that a distance between the pixel electrode layer 250 and the array switch 210 is also increased. That is, a distance between the pixel electrode layer 250 formed on the second passivation layer 240 and a data line of the array switch 210 is increased, thereby reducing coupling capacitance between the pixel electrode and the data line, and improving display quality of the display panel.

In an embodiment, a projection of the first passivation layer 204 on the underlayer 202 is located within a projection of the distance adjustment layer 230 on the underlayer 202, and the projection of the distance adjustment layer 230 on the underlayer 202 is located within a projection of the second passivation layer 240 on the underlayer 202. That is, viewing from a cross-sectional view in FIG. 2, the width of the second passivation layer 240 is greater than the width of the distance adjustment layer 230, and the width of the distance adjustment layer 230 is greater than the width of the first passivation layer 204, so that the through hole 260 is presented as a through hole having a stepped structure, thereby reducing the size of the through hole 260 and increasing the aperture ratio of the panel. In an embodiment, the first passivation layer 204, the second passivation layer 240, and the distance adjustment layer 230 may be obtained through etching by using a same mask, thereby forming a structure satisfying the foregoing width requirement, and the preparation process is easy. In other embodiments, the first passivation layer 204, the second passivation layer 240, and the distance adjustment layer 230 may also be obtained through preparation by using different masks. In an embodiment, the array switch includes a gate 206, a gate insulation layer 208, a semi-conductor layer 212, a source 214, and a drain 216. The gate 206 is formed on the underlayer 202. The gate insulation layer 208 is formed on the underlayer 202 and covers the gate 206. The semi-conductor layer 212 is formed on one side of the gate insulation layer 212 away from the gate layer 206. The source 214 and the drain 216 are formed on the gate insulation layer 208, and are respectively connected to two ends of the semi-conductor layer 212. In an embodiment, the array switch further includes a data line (not shown). The data line is one of conductive wires, and is formed on a same horizontal plane as the source 214 and the drain 216. The data line is connected to the source 214 to output an external data signal to the source 214 of a corresponding thin film transistor. It can be understood that the array switch 210 is also provided with a scanning line and a power line. The scanning line and the power line are both located on a same horizontal plane as the source 214 and the drain 216, and can be prepared through one process. The scanning line is connected to the gate 206 of the array switch.

In an embodiment, the underlayer 202 may be made of materials that are well known in this field, such as glass or plastics. The material of the gate 206 may be one or more of metal conductive materials such as aluminum and copper. In other embodiments, the gate 206 may also use other conductive materials. The material of the gate insulation layer 208 may also be silicon nitride or silicon oxide. The material of the gate insulation layer 208 may also be a combination of silicon nitride and silicon oxide. It can be understood that, the gate insulation layer 208 may also use other materials well known to those skilled in the art. In an embodiment, the semi-conductor layer 212 includes an amorphous silicon layer 212a and an N+ doped amorphous silicon layer 212b. The amorphous silicon layer 212a and the N+ doped amorphous silicon layer 212b are sequentially disposed on the gate insulation layer 208 in a stacking manner. Amorphous silicon (a-Si) is a form of silicon. Amorphous silicon does not have a complete diamond unit cell, and its purity is not high, but its melting point, density and hardness are obviously lower than those of crystalline silicon. The amorphous silicon layer (a-Si layer) 212a is used as an active layer, and can be formed through continuous deposition by using plasma enhanced chemical vapor deposition (PECVD). The N+ doped amorphous silicon layer 212b is formed above the amorphous silicon layer 212a. In this embodiment, the N+ doped amorphous silicon layer 212b is formed through continuous deposition by using the plasma enhanced chemical vapor deposition (PECVD). The source 214 and the drain 216 are formed through preparation by using a same metal layer. The source 214 and the drain 216 may be prepared by using conductive materials such as aluminum, copper, and molybdenum. The first passivation layer 204 is used as a protective layer, for protecting the array switch, to convert a metal surface in the array switch into a state of not being easily oxidized, thereby delaying a corrosion speed of metal. The first passivation layer 204 may use a PV insulation material.

The color filter layer 220 includes color photoresist blocks disposed at intervals. Types of the color photoresist blocks may be determined according to pixel designs. For example, when a pixel structure including a red subpixel (R subpixel), a blue subpixel (B subpixel), and a green subpixel (G subpixel) is used, the color photoresist blocks include a red photoresist block, a blue photoresist block, and a green photoresist block. When other pixel structures are used, types of the color photoresist blocks change accordingly, and are not limited to a particular composition.

The distance adjustment layer 230 is formed between the first passivation layer 204 and the second passivation layer 240. The distance adjustment layer 230 is an additional film layer, and therefore compared with the conventional COA substrate, the distance between the first passivation layer 204 and the second passivation layer 240 can be increased. When the distance between the first passivation layer 204 and the second passivation layer 240 is increased, the distance between the pixel electrode layer 250 and other conductive electrodes such as a data line is increased, thereby reducing parasitic capacitance Cpd between the pixel electrode layer 250 and the data line. The distance adjustment layer 230 may be a passivation layer or a color filter layer. In other embodiments, the distance adjustment layer 230 may also include the passivation layer and the color filter layer at the same time. It can be understood that the distance adjustment layer 230 may also use another film layer that does not affect display of the color filter layer 220, such as a transparent film layer.

In an embodiment, there may be one or more distance adjustment layers 230. The thickness of each distance adjustment layer 230 should not be too large, otherwise breakage easily occurs. Further, the thickness of each distance adjustment layer 230 is 100 microns to 200 microns. In an embodiment, the number of distance adjustment layers 230 is less than or equal to 10, and more than 10 layers may cause a problem that a light transmittance decreases. Further, the number of distance adjustment layers 230 may be 1 to 5. The thickness of the distance adjustment layer 230 is on a micron level. Therefore, with respect to the thickness of the entire display panel (the thickness of a glass substrate of the entire display panel is on a millimeter level), the order of magnitude are not in the same level, and therefore thinning of the entire display panel is not affected.

In an embodiment, the distance adjustment layer 230 is a passivation layer. To facilitate differentiation from the first passivation layer 204 and the second passivation layer 240 in subsequent descriptions, the passivation layer is referred to as an intermediate passivation layer. The number of intermediate passivation layers may be set to be less than or equal to 10, for example, 1 to 5. In an embodiment, the thickness of each intermediate passivation layer is controlled between 100 microns and 200 microns. The thicknesses of the intermediate passivation layers may be the same or different. In an embodiment, the intermediate passivation layer is formed through preparation by using a mask the same as the first passivation layer 204 or the second passivation layer 240. In another embodiment, the intermediate passivation layer, the first passivation layer 204, and the second passivation layer 240 are all obtained through preparation by using a same mask. In this case, a first opening is formed on the first passivation layer 204, a second opening is formed on the color filter layer 220, a third opening is formed on the intermediate passivation layer, and a fourth opening is formed on the second passivation layer 240. The first opening, the second opening, the third opening, and the fourth opening are in communication with each other, so as to form the through hole 260, via which the pixel electrode is connected to the array switch 210. A conductive material is covered in the through hole 260, to implement an electrical connection between the pixel electrode layer 250 and the array switch.

The distance adjustment layer that is also a passivation layer is prepared by using the mask the same as the first passivation layer 204 and/or the second passivation layer 240, so that it can be ensured that each through hole in the first passivation layer 204, the distance adjustment layer, and the second passivation layer 240 has the same or substantially the same size, thereby forming the through hole 260 having a step, as shown in FIG. 2, rather than forming a through hole shape presented in a big-end-up manner in the whole, as shown in FIG. 1. Referring to FIG. 2, the through hole 260 having a step has a smaller opening size with respect to the through hole structure in the figure. That is, the COA substrate in the present disclosure can reduce the size of the through hole 260, thereby increasing the aperture ratio of the panel.

Referring to FIG. 2, in this embodiment, there are two color filter layers 220, and there is one distance adjustment layer 230, and the distance adjustment layer 230 is an intermediate passivation layer. The one color filter layer 220 is directly formed on the first passivation layer 204, the distance adjustment layer 230 is formed between the two color filter layers 220, and the second passivation layer 240 is formed on the color filter layers 220 and covers the color filter layers 220. In this case, the thickness of the two color filter layers 220 may be the same as the thickness of a conventional single color filter layer, and adjustment in conformability can also be performed as long as a display requirement can be satisfied. In this embodiment, two surfaces of the color filter layer 220 close to the second passivation layer 240 are both flat surfaces. Correspondingly, two surfaces of the intermediate passivation layer are both flat surfaces, and therefore the difficulty of a preparation process will not be increased.

In an embodiment, the distance adjustment layer 230 is also an intermediate passivation layer. In this case, the number of color filter layers 220 is greater than the number of intermediate passivation layers by one. That is, each intermediate passivation layer is disposed between two adjacent color filter layers 220. In this case, the thickness of the two color filter layers 220 may be the same as the thickness of a conventional single color filter layer, and adjustment in conformability can also be performed provided that a display requirement can be satisfied.

In an embodiment, the distance adjustment layer 230 is a color filter layer. To differentiate from the color filter layer 220, the distance adjustment layer 230 can be referred to as an additional color filter layer. The additional color filter layer may be formed above the color filter layer 220 or below the color filter layer 220. The additional color filter layer may be prepared by using a mask the same as the color filer layer 220, so that the through hole 260 also has a step, thereby reducing the size of the through hole 260, and improving the aperture ratio of the panel. In an embodiment, there may be one or more additional color filter layers. A plurality of additional color filter layers are sequentially prepared by using a same mask, so as to ensure that the finally formed through holes 260 all have steps, thereby reducing the sizes of the through holes, and helping improve the aperture ratio of the panel. The additional color filter layer may be an entire color photoresist layer having a single color. To improve the display effect, the additional color filter layer may be formed by using color photoresist layer structures of different colors. The total thickness of the additional color filter layer and the color filter layer 220 may be the same as the thickness of a conventional single color filter layer, and adjustment in conformability can also be performed, as long as a display requirement can be satisfied.

An embodiment of the present disclosure further provides a display panel. The display panel includes the substrate according to any one of the foregoing embodiments. The display panel may be a liquid crystal display panel. The display panel may be applied to various display terminals, for example, a mobile phone, a personal digital assistant (PDA), a digital camera, a computer screen, or a notebook computer screen.

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall all fall within the protection scope of the present disclosure. Therefore, the protection scope of the patent of the present disclosure shall be subject to the appended claims.

What is claimed is:

1. A substrate, comprising:
an underlayer;
an array switch formed on the underlayer;
a first passivation layer formed on the array switch;
a second passivation layer located on the first passivation layer;
two color filter layers both formed between the first passivation layer and the second passivation layer;
a distance adjustment layer formed between the two color filter layers, to increase a distance between the first passivation layer and the second passivation layer, wherein the distance adjustment layer is a passivation layer; and
a pixel electrode layer formed on the second passivation layer, wherein the pixel electrode layer is electrically connected to the array switch via a through hole penetrating the first passivation layer, the color filter layer, the distance adjustment layer, and the second passivation layer.

2. The substrate according to claim 1, wherein a projection of the first passivation layer on the underlayer is located within a projection of the distance adjustment layer on the underlayer, and the projection of the distance adjustment layer on the underlayer is located within a projection of the second passivation layer on the underlayer.

3. The substrate according to claim 1, wherein the distance adjustment layer is a film layer prepared by using a mask the same as the first passivation layer.

4. The substrate according to claim 1, wherein the distance adjustment layer is a film layer prepared by using a mask the same as the second passivation layer.

5. The substrate according to claim 1, wherein the number of the distance adjustment layers is less than or equal to 10.

6. The substrate according to claim 5, wherein the distance adjustment layer is a passivation layer, and the number of the distance adjustment layers is 1 to 5.

7. The substrate according to claim 5, wherein a thickness of each distance adjustment layer is 100 microns to 200 microns.

8. The substrate according to claim 5, wherein each distance adjustment layer is disposed between two adjacent color filter layers.

9. The substrate according to claim 1, wherein the distance adjustment layer is a transparent film layer.

10. The substrate according to claim 1, wherein a surface of each distance adjustment layer is a flat surface.

11. The substrate according to claim 1, wherein the array switch comprises:
a gate formed on the underlayer;
a gate insulation layer formed on the underlayer and covering the gate;
a semi-conductor layer formed on the gate insulation layer; and
a source and a drain formed on the gate insulation layer, and connected to two ends of the semi-conductor layer, respectively;
wherein the array switch further comprises a data line, a scanning line, and a power line;
the data line is formed on a same horizontal plane as the source and the drain, the scanning line and the power line are both located on a same horizontal plane as the source and the drain, and the scanning line is connected to the gate of the array switch.

12. The substrate according to claim 11, wherein the pixel electrode layer is connected to the drain in the array switch.

13. The substrate according to claim 11, wherein the semi-conductor layer comprises an amorphous silicon layer and an N+ doped amorphous silicon layer, the amorphous silicon layer and the N+ doped amorphous silicon layer are sequentially laminated on the gate insulation layer.

14. The substrate according to claim 1, wherein the through hole is a through hole having a stepped structure.

15. A display panel, comprising a substrate, wherein the substrate comprises:
an underlayer;
an array switch formed on the underlayer;
a first passivation layer formed on the array switch;
a second passivation layer located on the first passivation layer;
two color filter layers both formed between the first passivation layer and the second passivation layer;
a distance adjustment layer formed between the two color filter layers, to increase a distance between the first passivation layer and the second passivation layer, wherein the distance adjustment layer is a passivation layer; and
a pixel electrode layer formed on the second passivation layer, wherein the pixel electrode layer is electrically connected to the array switch via a through hole penetrating the first passivation layer, the color filter layer, the distance adjustment layer, and the second passivation layer.

16. The display panel according to claim 15, wherein a projection of the first passivation layer on the underlayer is located within a projection of the distance adjustment layer on the underlayer, and the projection of the distance adjustment layer on the underlayer is located within a projection of the second passivation layer on the underlayer.

17. The display panel according to claim 15, wherein the display panel is a liquid crystal display panel.

* * * * *